United States Patent [19]

Forss et al.

[11] Patent Number: 5,110,414

[45] Date of Patent: May 5, 1992

[54] PROCEDURE FOR MANUFACTURING LIGNOCELLULOSIC MATERIAL PRODUCTS

[75] Inventors: Kaj G. Forss; Agneta G. M. Fuhrmann; Martti Toroi, all of Espoo, Finland

[73] Assignee: Oy Keskuslaboratorio - Centrallaboratorium AB, Finland

[21] Appl. No.: 660,165

[22] PCT Filed: Mar. 7, 1988

[86] PCT No.: PCT/FI88/00033

§ 371 Date: Sep. 8, 1989

§ 102(e) Date: Sep. 8, 1989

[87] PCT Pub. No.: WO88/07104

PCT Pub. Date: Sep. 22, 1988

Related U.S. Application Data

[63] Continuation of Ser. No. 399,506, Sep. 8, 1989, abandoned.

[30] Foreign Application Priority Data

Mar. 9, 1987 [FI] Finland ................................ 871010

[51] Int. Cl.⁵ ............................................ D21H 17/23
[52] U.S. Cl. ..................................... 162/163; 162/11; 162/12; 162/164.6; 162/168.2
[58] Field of Search .................... 162/11, 12, 16, 163, 162/168.2, 164.6; 106/123.1

[56] References Cited

U.S. PATENT DOCUMENTS

| | | |
|---|---|---|
| 2,849,314 | 8/1958 | Goss ................................... 162/163 |
| 3,159,528 | 12/1964 | Goss ................................... 162/163 |
| 3,236,720 | 2/1966 | Tousignant et al. ................ 162/163 |
| 3,615,788 | 10/1971 | Limbert et al. ................... 106/123.1 |
| 4,357,454 | 11/1982 | Holmberg ........................ 106/123.1 |

FOREIGN PATENT DOCUMENTS 681140 8/1979 U.S.S.R. .............................. 162/163

*Primary Examiner*—Peter Chin
*Attorney, Agent, or Firm*—Andrus, Sceales, Starke & Sawall

[57] ABSTRACT

A procedure for manufacturing lignocellulosic material products and for improving their strength and water resistance characteristics, high-molar mass lignin derivatives being added to the lignocellulosic material, of which at least 35% by weight are over 5000 in molar mass.

15 Claims, 3 Drawing Sheets

PROCEDURE FOR MANUFACTURING LIGNOCELLULOSIC MATERIAL PRODUCTS

This application is a continuation of Ser. No. 07/399,506, filed Sep. 8, 1989 abandoned.

The present invention concerns a procedure for manufacturing lignocellulosic material products and for improving their strength and water resistance properties using high-molar mass lignin derivatives. Such products are e.g. those of the paper and cardboard industry and those of the industry manufacturing building materials, such as corrugated board, cardboard, kraftliner, paper cores, wood composites, fibreboard and chipboard, and insulation materials. It is possible to improve by the procedure not only the characteristics of products made of primary fibres but also to enable high-grade products to be made of lower grade raw materials such as reclaimed fibres.

BACKGROUND OF THE INVENTION

In cellulose manufacturing processes in which wood chips are heated in a cooking solution under pressure, about half of the wood is dissolved, forming the so-called waste liquor. One of the main organic components of waste liquor is lignin. In the sulphite process, in which an acid bisulphite/sulphur dioxide solution serves as digesting liquor, lignin is present in the waste liquor in sulphonated form, as so-called lignosulphonates. In this form, lignin is soluble in water also in acid solutions. On the other hand, in alkaline cellulose manufacturing processes, such as the soda process (NaOH as digesting solution), in the kraft process (NaOH, $Na_2S$, NaHS as digesting solution) or in the oxygen/alkali process (with NaOH in the presence of oxygen), lignin is present in the form of an Na salt in the waste liquor, and it is water-soluble in alkaline solutions.

It is known in the art that the characteristics of e.g. paper, cardboard and fibre boards can be improved by adding lignin to the fibres, most often in the form of waste liquor. The problem has, however, been the poor retention of said lignin products, that is, poor adhesion to the fibres. For instance, it has been possible to improve the strength properties of corrugated board by adding to the fibre stock 6% by weight, calculated on the dry matter of the stock, thermally processed lignin isolated from sulphite waste liquor (Zellstoff und Papier 24 (1975): 9, 269-70). It is observed, however, in the reference that using lignin cannot be contemplated because the BOD values of the waste liquor become too high owing to its poor retention.

In the Canadian Patent CA 729,140 lignin is used in the form of sulphite waste liquor or black liquor for improving the strength characteristics of paper. Of the dry matter of the black liquor only 26% by weight could be made to adhere to the fibres. All the same, the procedure was considered to be economically advantageous because the concora values of the paper increased from 66.3 points to 87.6 points. A retention of equal degree, about 30% by weight, has also been reached in a Russian study (Bumazh Prom. 11 (1984): 18-19), in which kraft lignin was precipitated with alum onto the paper fibres. The lignin quantity used was over 8% by weight of lignin dry matter, calculated on the dry matter of the fibres. In spite of poor retention, the breaking, punching and rigidity characteristics of the paper could be improved.

The effect of kraft lignin on the strength of fibre board made from waste paper has been compared in an American study (Forest Products J. 28 (1978): 77-82) with the effect of phenol formaldehyde resin. Of the dry matter of the kraft lignin product used, 54.8% by weight was organic matter and 44% by weight was inorganic matter. When pH was adjusted with sulphuric acid to 4.5, only 15 g dry matter out of 100 g were precipitated. Precipitation could be somewhat improved by raising the precipitation temperature to 70° C.; although lignin had to be added 11% by weight, calculated as dry matter related to the dry matter of the fibres, in order to achieve equally good strength characteristics as with 3% by weight phenol formaldehyde addition. Cost calculation analysis revealed that phenolic resin was somewhat more favourable in use than lignin owing to higher lignin addition and oxygen consumption, and to the heating required in precipitating it.

Corrugated board manufactured from reclaimed fibre stock has been impregnated, in Italy, in a sizing press with both NSSC waste liquor and black liquor (Eucepa Conference, Florence, Oct. 6-10, 1986, Proc. Vol. II, 24; 1-31). Subsequent to impregnation, the board was dried at 100°-140° C. The waste liquors originated from poplar and straw cookings. In most of the experiments, the characteristics of the board improved owing to the impregnation. Better results were obtained using the waste liquor at dry matter constant 20-30% by weight than when it was used in dilute solutions, which necessitated performing the impregnation in a plurality of steps. On the other hand, lowering the pH of the waste liquors reduced the strength properties of the board. The board impregnated with waste liquor obtained from straw cooking absorbed more moisture than untreated corrugated board.

Lignin has been chemically modified, particularly for improving its water resistance properties. It has for instance been reacted with amines (Wochenblat fur Papierfabrikation 94 (1966): 4, 107-110), whereafter it has been reacted with formaldehyde (U.S. Pat. No. 3,079,353) or peroxide (SU 520,260). Alakli lignin has, for instance, been sulphonated and used together with starch in order to increase the rigidity of a liner manufactured from waste paper (U.S. Pat. No. 3,644,167). From rice soda black liquor, cyanoethyllignin and aminolignin have been manufactured, and they have been used e.g. in paper sizing (Paperi ja Puu 62 (1980): 10, 589-592, 614). Lignin has also been heat-treated: e.g. lignosulphonates at about 250° to 300° C., with the purpose of converting them into a form insoluble in water (U.S. Pat. No. 2,934,531 and Zellstoff und Papier 18 (1969): 11, 328-332). Using this kind of products it has been possible to improve the characteristics of corrugated board and kraft.

Kraft lignin, having average molar mass 25,000-30,000, has been used in manufacturing cardboard, corrugated board and wrapping paper (SU 681,140). As disclosed in said reference, the lignin is added to an aqueous solution containing 2-40% by weight fatty acids and resin acids, and the mixture is heated in an alkali at 80° to 85° C. before use. The dry matter content of the mixture is about 14-18% by weight and the pH is 8-9. The fatty acids and resin acids have probably been added in order to improve the hydrophobic properties. When this mixture was added to a cardboard fibre stock in amount 3% by weight, calculated as dry matter related to the dry matter of the stock, the bursting strength of the cardboard was improved 5% and the tensile strength, 18%.

High-molar mass alkaline kraft lignin has been added 1 to 7% by weight, calculated as dry matter related to the stock dry matter, to a fibre stock used in manufacturing paper and cardboard (SU 374,407). The lignin is added as an alkaline aqueous solution to the stock, and thereafter, 3% by weight of divinylstyrene/rubber latex in emulsion form, containing 75% by weight styrene related to the latex dry matter, is added thereto. Thereafter, the components are precipitated with aluminum sulphate. The rigidity of paper and cardboard could hereby be improved, in comparison with products reinforced with latex alone. The additions are comparatively low, only about 1-7% by weight lignin.

Improved absorptive paper suitable for lamination can be manufactured by adding to the paper in the sizing press, after web formation, high-molar mass lignin, of which at least 50% by weight is over 5000 in molar mass (FI 58,961). The lignin product may consist of lignosulphonates or kraft lignin, and the additions are 0.1 to 10% by weight of the dry paper weight. According to the reference, lignin accelerates the absorption of phenolic resin in the paper but does not affect the tensile strength of the paper.

In the Finnish Patent FI 58788, lignin derivatives are used, of which at least 35% by weight, advantageously 40% by weight, are over 5000 in molar mass. By mixing them with phenol formaldehyde resin and adjusting pH of the bonding agent to be in the range 8-14, preferably 9-13, a waster resistant bonding agent can be manufactured for chipboard, plywood and fibre boards.

As will be evident from the foregoing, the greatest problems in using lignin as a reinforcing agent for various materials has been caused by the poor retention of lignin products, that is, their poor adhesion to fibres.

In the Patent SU 681,140, a lignin product having a given average molar mass (25,000-30,000) has been used. Since lignin is not homogeneous in structure but consists of lignin derivatives differing greatly in molar mass, the value stated for the average molar mass in fact fails to specify the kind of the lignin product used. It may consist of very high-molar mass and very low-molar mass lignin derivatives in varying proportions so that the mean of their molar masses will be 25,000-30,000. It is probably because of the poor adhesion to fibres of low-molar mass lignin derivatives that fatty and resin acids had to be used in addition in this instance in order to improve the hydrophobic properties.

Endeavours have also been made to improve the retention of lignin and the strength and water resistance properties of fibre material chemically by modifying lignin, but the economy of the procedure has suffered in that case.

SUMMARY OF THE INVENTION

With the aid of the procedure of the invention, a decisive improvement is achieved regarding the drawbacks mentioned in the foregoing.

The most significant advantage of the invention is that by applying it, products can be manufactured of various lignocellulosic materials in a sensible way, more advantageously in technical and economical respect than by any other method. Using the procedure now invented, strong bonds, probably hydrogen bonds, are obtained between the lignin derivatives and the lignocellulosic material, owing to which the products possess excellent strength and water resistance properties. Since the retention of lignin in lignocellulosic material is nearly complete applying the method now invented, lignin can be made adherent to the lignocellulosic material up to 100% by weight, calculated as dry matter related to the dry matter of the lignocellulosic material, at the same time improving the properties of the products. Owing to lignin addition, the production of some products can be increased up to 50%. The procedure enables recycled raw materials advantageous in price to be used e.g. instead of virgin fibres. Applying the procedure of the invention, the strength and water resistance properties of products produced from second grade fibres can be improved to be on a level with products based on virgin fibres.

The procedure is also advantageous from the viewpoint of the cellulose mill because the lignin going to fuel can now be utilize. There will be free recovery boiler capacity, and the production of cellulose may therefore be increased without having to invest in a new recovery boiler. The removal from the waste liquor of the high-molar mass lignin enables the waste liquor to be evaporated to higher dry matter content prior to the recovery boiler, without any difficulties with viscosity. Hereby the energy required in the soda boiler for evaporating water will be less because the quantity of feed water is significantly less.

The procedure is furthermore economically advantageous e.g. from the viewpoint of the plant manufacturing lignocellulosic products because to the lignocellulose suspension, mostly used at high dilution, lignin solution, lignin suspension or lignin powder with partly considerably higher dry matter content is added. Hereby, the amount of water to be evaporated per ton of product will be less. In addition, lignin is advantageous in price, e.g. compared with many wet-strengths resins, such as urea-formaldehyde resin or polyethylene-imine.

To the lignosellulosic material products manufactured with the procedure of the invention any additives and components, known per se e.g. plastic raw materials may be added for instance for improving the strength and water resistance or other properties of the products. Thus e.g. resin or resin raw materials, such as phenol formaldehyde resin may be added to the lignocellulosic material in any concentration, for instance less than 10% by weight or less than 5% by weight calculated as dry matter on the mixture of the lignin derivatives and resin, e.g. before or after the addition of the lignin derivatives to the lignocellulosic material.

It is to be noted that it is not mandatory in the procedure of the invention to co-polymerize the lignin derivatives in question with resins. So the lignocellulosic material products may be free of resin.

As regards environmental protection, it is a remarkable advantage of the present invention that when it is applied to the lignin is merely 100% attached to the fibres. Furthermore, the BOD values of the plant's effluents will not increase, as is the case when impure lignin products containing organic acids and other low-molar mass compounds in abundance are used. When using lignin derivatives according to the invention, no toxic low-molar mass sulphur compounds, such as hydrogen sulphide for instance, are released during the manufacturing process, as are for instance set free from sulphate waste liquor in acid conditions.

DESCRIPTION OF THE PREFERRED EMBODIMENT

The invention is described in the following in detail. The high-molar mass lignin derivatives used in the procedure of the invention are isolated e.g. from waste liquor of an alkaline cellulose process or from waste liquor after bleaching by a lignin fractionating method known in itself in the art, such as precipitatior with acid, or by an ultrafiltration process. At least 35% by weight of the high-molar mass lignin derivatives should have molar mass higher than 5000. The molar mass distributions of lignin derivatives can be determined using gel chromatography, as is disclosed in detail in the Finnish Patent No. 58788.

The so-called degree of purity of the lignin has a great significance because when impure lignin products are precipitated onto lignocellulosic materials, the impurities will not adhere to fibres and are discharged into the plant's effluent circulation. Of the lignin derivatives used in the procedure of the invention, over 70% by weight of the total dry matter of the lignin fraction should precipitate from a 1-5% by weight solution with 1M hydrochloric acid at pH 3. The degree of purity of the lignin fraction can be found out with the aid of hydrochloric acid precipitation, since low-molar mass phenolic compounds, and other inorganic and organic impurities, will not be precipitated in such a determination.

The lignin derivatives of the invention may be used in the form of a dilute solution, of an evaporated concentrated solution, of a suspension, or of a powder, e.g. spray-dried. Their dry matter content at the moment of use may therefore vary, depending on the manufacturing process of the product, in the range 0.1 to 100% by weight.

The acid quantity required to lower pH below 7 may be added to the lignin, to the lignocellulosic material or to the lignocellulose/lignin mixture, depending on which is most advantageous in view of the manufacturing process.

It is possible to add to the lignocellulosic material, in addition to lignin, bivalent or trivalent metal salts, such as alum, ferric or ferrous sulphate, or ferric chloride. Also organic, commonly known cationic precipitation chemicals, such as polyethylene imine, may be used. The amount of precipitation chemical added depends on the pH of the lignin derivatives and of the lignocellulosic material, and it is usually 0.5-20% by weight, calculated as dry matter related to the dry matter of the lignin/lignocellulose mixture, advantageously about 1-3% by weight.

The amount of high-molar mass lignin derivatives added to the lignocellulosic material varies in general in the range between 1 to 100% by weight, calculated as dry matter related to the lignocellulosic material dry matter, depending on the requirements set for the product.

The lignin derivatives may, as taught by the invention, be added e.g. to finely divided lignocellulosic material, such as to fibres, to chips or to an aqueous suspension made thereof, before the manufacturing process of the product or in conjunction therewith, e.g. on the paper machine or in the sizing press. As taught by the invention, the lignin may also be added to the lignocellulosic material, or on the surface of the product produced, or to be produced, thereof, as a coating or sizing, or it may be added as a bonding agent to the lignocellulosic material between different layers. The lignocellulosic material, or the product manufactured thereof, may also be impregnated with a lignin solution or suspension e.g. when manufacturing insulating materials.

If desired, the lignin derivatives of the invention may also be chemically modified, e.g. by condensation with formaldehyde, by oxidation with air, or by binding amine groups thereto; in most cases, however, fully satisfactory properties are achieved by using the above-mentioned lignin derivatives as such.

The following examples describe the present invention, however without confining it.

EXAMPLE 1

The effect of the properties of lignin on its retention and on the characteristics of liner made from reclaimed fibres From a kraft process, black liquor was isolated by ultrafiltration, on the basis of molar mass, lignin derivatives of different molar mass distribution and purity level. In Table 1 are stated the characteristics determined for said lignin fractions ($R_3$, $R_4R_5$, $R_9$, $R_{10}$, $R_{24}$ and $R_{32}$) and for the kraft black liquor after ultrafiltration.

In Table 1, the molar mass distributions (MWD) of the lignin derivatives have been determined according to the method given in the Finnish patent application No. 58788, and they are stated as proportion of lignin derivatives exceeding molar mass 5000, in percent by weight of all lignin derivatives. The proportion of precipitating stated in percent by weight of the total dry matter of the lignin fraction when precipitating lignin from a solution with dry matter content 1-5% by weight with 1M hydrochloric acid at pH 3. Sodium sulphide, sodium and ash content are stated in percent by weight calculated on the dry matter of the lignin fraction.

TABLE 1

| | Characteristics of the examined sulphate lignin fractions and sulphate waste liquor subsequent to ultrafiltration (% b.w.) | | | | | | | |
|---|---|---|---|---|---|---|---|---|
| Lign. fract. | MWD M > 5000 % | Prec. lign. % | Mean cont. % | Dens. (23° C.) g/cm$^3$ | Na$_2$S % | Na % | Ash % | Visc. (23° C.) mPa·s |
| Waste liquor | 21 | 31 | 27,0 | 1,1607 | 5,3 | 20,4 | 49,9 | 2 |
| $R_3$ | 30 | 57 | 23,0 | 1,1248 | 2,4 | 15,7 | 36,7 | 3 |
| $R_4$ | 32 | 65 | 25,5 | 1,1346 | 2,0 | 14,5 | 33,3 | 3 |

TABLE 1-continued

Characteristics of the examined sulphate lignin fractions
and sulphate waste liquor subsequent to ultrafiltration (% b.w.)

| Lign. fract. | MWD M > 5000 % | Prec. lign. % | Mean cont. % | Dens. (23° C.) g/cm$^3$ | Na$_2$S % | Na % | Ash % | Visc. (23° C.) mPa·s |
|---|---|---|---|---|---|---|---|---|
| R$_5$ | 35 | 70 | 27,8 | 1,1435 | 1,6 | 13,2 | 31,4 | 3 |
| R$_9$ | 40 | 78 | 22,1 | 1,1028 | 0,6 | 10,9 | 25,2 | 5 |
| R$_{13}$ | 46 | 82 | 19,7 | 1,0872 | 0,2 | 9,3 | 20,6 | 7 |
| R$_{24}$ | 49 | 87 | 17,0 | 1,0709 | 0,02 | 7,2 | 13,1 | 9 |
| R$_{32}$ | 54 | 89 | 21,1 | 1,0878 | <0,01 | 7,3 | 15,9 | 10 |

As a measure measure of the degree of purity of lignin one may take the proportion of precipitable lignin, which varied, as can be seen in Table 1, between 31 and 89% by weight. The impure fractions contained large quantities of sodium sulphide, which is converted into toxic hydrogen sulphide gas when pH is lowered into the alkaline range. This phenomenon is already in itself a bar to using impure, lignin derivatives with high content of low-molar mass compounds in the range below pH 7. By using high-molar mass, pure lignin derivatives this drawback was eliminated. The high-molar mass fraction with higher purity also contained less sodium than the low-molar mass fractions, and this is advantageous in view of the acid and/or alum quantity used in precipitation.

The pH values of the lignin fractions entered in Table 1 were adjusted with sulphuric acid to pH 6.6 and they were added to stock made from reclaimed fibres having consistency 12.2 g/l and pH 6.9. The composition of the stock was: 55% by weight magazines, 30% by weight newsprint and 15% by weight corrugated board. Lignin was added 5% by weight, calculated as dry matter related to the stock dry matter. Subsequent to the lignin addition, 1.5% by weight of alum was added as a 3% solution, calculated as dry matter related to the stock dry matter. In this example, and in those following thereafter, "alum" is understood to mean aluminium sulphate containing crystal water: $Al_2(SO_4)_3 \cdot 16H_2O$. The retention, or the proportion of lignin that has become adherent to fibres of the original lignin quantity, was determined on the basis of ultraviolet absorption measurements (A 280 nm) of the slurry water and the original lignin solution.

Of the stock, sheets were madeets in the laboratory, having grammages about 150 g/m$^2$ and thickness about 0.29 mm. From the sheets thus produced, the following characteristics were determined: thickness, density, air permeability (SCAN-P 19:78), compression strength, the so-called SCT (SCAN-P 46-83) and CCT (Corrugated Crush Test, SCAN-P 42:81), tensile strength and tensile index (SCAN-P 16:76, tensile index=tensile strength divided by base weight), and water uptake of the sheets by the so-called drop of water method (Drop of Water, TAPPI RC-70). The characteristics and retentions are stated in Table 2.

TABLE 2

The characteristics of the sheets achieved using kraft black liquor and various kraft lignin fractions.

| | MWD >5000 % | Prec. lign. % | Ret. % | Dens. kg/m$^3$ | Air perm. s/100 ml | Comp. str. CCT kN/m | Comp. str. SCT kN/m | Tens. str. kN/m | Tens. index Nm/g | Water Drop s |
|---|---|---|---|---|---|---|---|---|---|---|
| Without lignin | | | | 507 | 78 | 1,54 | 2,19 | 4,8 | 35,8 | 13 |
| Waste liquor | 21 | 31 | 42 | 505 | 110 | 1,91 | 2,85 | 5,4 | 36,5 | >300 |
| R$_3$ | 30 | 57 | 77 | 510 | 131 | 1,95 | 2,85 | 5,8 | 38,2 | " |
| R$_4$ | 32 | 65 | 81 | 522 | 140 | 2,01 | 2,86 | 6,0 | 39,0 | " |
| R$_5$ | 35 | 70 | 94 | 539 | 158 | 2,01 | 3,07 | 6,1 | 39,9 | " |
| R$_9$ | 40 | 78 | 95 | 516 | 147 | 1,88 | 2,90 | 5,8 | 40,0 | " |
| R$_{13}$ | 46 | 82 | 97 | 525 | 165 | 2,02 | 3,14 | 5,9 | 39,9 | " |
| R$_{24}$ | 49 | 87 | 99 | 534 | 181 | 2,04 | 3,22 | 6,0 | 40,0 | " |
| R$_{32}$ | 54 | 89 | 98 | 563 | 216 | 2,38 | 3,66 | 7,0 | 42,2 | " |

As can be seen from the retention values presented in Table 2, low-molar mass lignin derivatives adhered poorly to the fibres. Retentions over 90% were achieved with fractions of which more than 35% by weight had molar mass higher than 5000 and which had degree of purity (proportion of precipitable lignin, over 70% by weight of the total lignin.

The water resistance properties of the sheets improved in all lignin fractions in comparison with sheets produced from reclaimed fibres alone, the water drop penetrating into the latter in about 10 to 20 seconds. In the case of the sheets containing lignin the measurements were discontinued when 300 seconds had passed.

Figure 1:
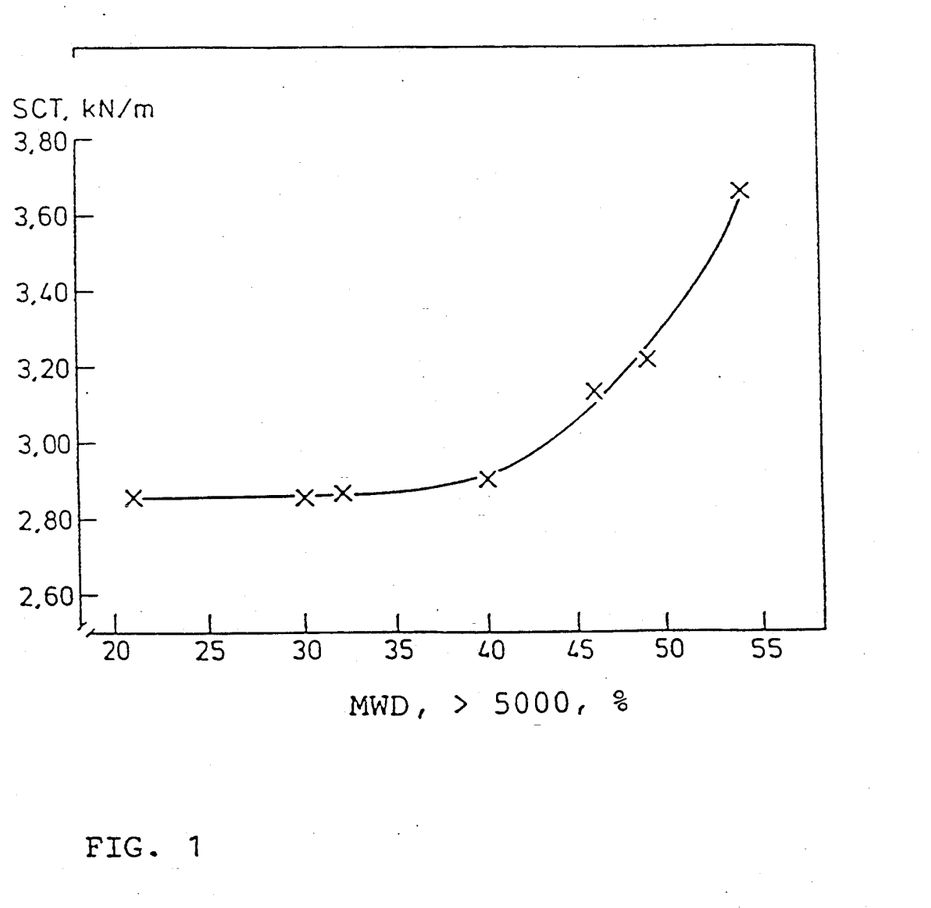
FIGS. 1 is a graph showing the variation in compressive strength with the molar mass of the lignin derivatives.

The properties of the sheets all improved with increasing molar mass and degree of purity of the lignin. Improvement of properties could even be achieved with black liquor alone, but its use, like the use of other impure fractions, is rendered doubtful by poor retention, which would create environmental problems for the mill. A very important characteristic, namely the compression strength (SCT), improved significantly when the molar masses of the lignin derivatives increased ≧35% by weight M>5000 and the degree of purity rose over 70% by weight (FIG. 1).

EXAMPLE 2

The effect of pH adjustment on the characteristics of liner produced from reclaimed fibres The high-molar mass kraft lignin fraction with 74% by weight having molar mass higher than 5000 and having degree of purity 89% by weight was isolated from kraft black liquor by ultrafiltration. The pH of the fraction as such was 12.6.

The fraction was divided into 8 parts, their pH values being lowered with sulphuric acid to be in the range pH 3 to 10. In the solutions having pH below 6.5, part of the lignin was present in precipitated form as a suspension. The dry matter content of all solutions/suspension was 3.0% by weight.

From waste paper a stock was produced which had a consistency of 4 g/l. The stock was divided into batches and their pH was adjusted to 7, 5 and 3, respectively. The above-mentioned lignin-water suspensions were added to the stock batches so that the lignin addition was 30% by weight, calculated as dry matter related to the stock dry matter.

Thereafter, 3% alum was added as a 2% by weight aqueous solution, calculated as dry matter related to the stock dry matter.

From the lignin/stock mixture liner sheets were produced which had base weight were 140-150 g/m$^2$ and thickness about 0.25 mm. The characteristics of the sheets are stated in Table 3.

EXAMPLE 3

The effect of the order of adding lignin, acid and precipitation chemical

The pH of the high-molar mass kraft lignin fraction as in Example 2 was adjusted with sulphuric acid to be pH 5. The dry matter content of the lignin solution was 3% by weight. The sulphuric acid quantity required for said pH adjustment was added, in another experiment, directly to stock made from reclaimed fibres, having a consistency of 8 g/l and pH 6.8. In this case, lignin was added to the stock in the form of a solution having pH 12.6. The lignin addition was about 30% by weight, calculated as dry matter related to the stock dry matter. For precipitation chemical, alum was used in the experiments, this being added in the form of a 3% by weight solution at 2% by weight, calculated as dry matter

TABLE 3

The effect of the pH values of reclaimed fibre stock, kraft lignin and lignin/fibre mixture on the characteristics of liner sheets.

| Stock pH | Lign. pH | Fibre/ lign./al mixt. pH | Dens. kg/m$^3$ | Air perm. s/100 ml | Comp. str. SCT kN/m | Comp. str. CCT kN/m | Tens. str. Nm/g | Cobb$_{60}$ value index g/m$^2$ |
|---|---|---|---|---|---|---|---|---|
| Without lignin | | | 505 | 126 | 2,81 | 1,77 | 36,2 | 151 |
| 7 | 12,6 | 12 | 546 | 304 | 2,74 | 1,85 | 38,5 | 102 |
| " | 9 | 7 | 536 | 208 | 3,03 | 1,95 | 41,7 | 56 |
| " | 8 | 7 | 480 | 208 | 2,94 | 1,70 | 41,0 | 54 |
| " | 6,5 | 6 | 566 | 320 | 3,02 | 2,02 | 41,7 | 21 |
| " | 5 | 5 | 682 | 382 | 3,58 | 2,11 | 40,3 | 22 |
| " | 4 | 5 | 615 | 487 | 3,79 | 2,14 | 42,2 | 21 |
| " | 3 | 4 | 579 | 525 | 3,75 | 2,19 | 41,8 | 25 |
| 5 | 12,6 | 10 | 526 | 193 | 2,92 | 1,72 | 40,0 | 197 |
| " | 10 | 7 | 520 | 188 | 2,95 | 1,77 | 39,3 | 94 |
| " | 8 | 6 | 532 | 213 | 3,07 | 1,96 | 39,7 | 25 |
| " | 6,6 | 6 | 540 | 233 | 3,31 | 2,02 | 42,6 | 22 |
| " | 5 | 5 | 733 | 302 | 3,48 | 2,97 | 37,4 | 17 |
| " | 4 | 4 | 549 | 314 | 3,69 | 2,08 | 42,6 | 17 |
| 3 | 12,6 | 9 | 596 | 182 | 2,93 | 2,12 | 38,7 | 182 |
| " | 10 | 6 | 541 | 217 | 3,14 | 1,96 | 39,1 | 30 |
| " | 8 | 5 | 566 | 254 | 3,52 | 2,03 | 41,7 | 18 |
| " | 6,6 | 4 | 602 | 332 | 3,69 | 2,09 | 39,9 | 19 |
| " | 5 | 4 | 581 | 308 | 3,50 | 2,06 | 37,4 | 28 |
| " | 4 | 4 | 634 | 279 | 3,68 | 2,11 | 37,9 | 19 |

As can be seen in Table 3, the characteristics of the sheets, in particular the SCT, CCT and Cobb values, improved considerably when the pH of the slurry/lignin/alum mixture fell below 7.

related to the fibre stock dry matter.

In the experiments the order of adding kraft lignin, sulphuric acid and alum to the fibre stock was varied. From the lignin/stock mixtures sheets were produced which had base weight 140-150 g/m$^2$ and thickness 0.25 mm. The lignin retention and the characteristics of the sheets are stated in Table 4.

TABLE 4

The effect of order of adding lignin (SA), acid (H$_2$SO$_4$) and precipitation chemical (alum) on the characteristics of sheets. Cases in which sulphuric acid was added to the lignin in advance are marked (SA + H$_2$SO$_4$).

| Order of addition to stock | Mixt. pH | Ret. % | Dens. kg/m$^3$ | Air perm. s/100 ml | Comp. str. SCT kN/m | Comp. str. CCT kN/m | Tens. str. Nm/g | Cobb$_{60}$ ind. value[1] g/m$^2$ |
|---|---|---|---|---|---|---|---|---|
| Stock without lignin | 6,8 | — | 505 | 126 | 2,81 | 1,77 | 36,2 | 151 |
| 1) (SA + H$_2$SO$_4$) 2) Alum | 6,3 | 99 | 585 | 539 | 3,77 | 2,18 | 40,2 | 18 |
| 1) Alum 2) (SA + H$_2$SO$_4$) | 6,1 | 99 | 601 | 594 | 3,88 | 2,24 | 39,9 | 19 |
| 1) H$_2$SO$_4$ 2) SA 3) Alum | 5,7 | 99 | 584 | 496 | 3,97 | 2,18 | 43,9 | 17 |
| 1) Alum 2) SA 3) H$_2$SO$_4$ | 5,7 | 99 | 571 | 544 | 3,92 | 2,39 | 44,0 | 17 |
| 1) H$_2$SO$_4$ | 5,6 | 99 | 588 | 584 | 3,97 | 2,22 | 43,6 | 18 |

TABLE 4-continued

The effect of order of adding lignin (SA), acid (H₂SO₄) and precipitation chemical (alum) on the characteristics of sheets. Cases in which sulphuric acid was added to the lignin in advance are marked (SA + H₂SO₄).

| Order of addition to stock | Mixt. pH | Ret. % | Dens. kg/m$^3$ | Air perm. s/100 ml | Comp. str. SCT kN/m | Comp. str. CCT kN/m | Tens. str. Nm/g | Cobb$_{60}$ ind. value[1] g/m$^2$ |
|---|---|---|---|---|---|---|---|---|
| 2) Alum 3) SA | | | | | | | | |
| 1) SA 2) H₂SO₄ 3) Alum | 5,7 | 97 | 599 | 531 | 3,97 | 2,36 | 45,2 | 11 |

[1] SCAN-P 12:64, states the water quantity (in g/m$^2$) meter, which the paper or cardboard surface absorbs in 60 seconds from a water column 1 cm in height covering it.

As can be seen in Table 4, good retentions were achieved independent of the order in which lignin, acid and alum were added, and the characteristics of the sheets improved in all instances in comparison with reclaimed fibre alone.

EXAMPLE 4

The effect of lignin quantity added on the characteristics of reclaimed fibre liner To stock produced from reclaimed fibres, having pH about 7 and consistency about 10 g/l, was added high-molar mass lignin of which 54% had molar mass higher than 5000, at 0, 0.5, 2.5, 5, 7, 10, 15, 20, 30, 40, 50 and 60% by weight as dry matter, calculated on the stock dry matter. The dry matter content of the lignin solution was 3% and its pH had been adjusted to be below 7 before addition to the fibre stock. After the lignin addition, alum as 3% solution was added 1.5-2% by weight, calculated as dry matter related to the stocky dry matter. The stock/lignin/alum mixtures had pH values varying between 5 and 6. The retention was between 94 and 100% in all cases. The grammages of the sheets were about 150 g/m² and the thickness about 0.25 mm; the other characteristics are seen in Table 5.

Figure 3:
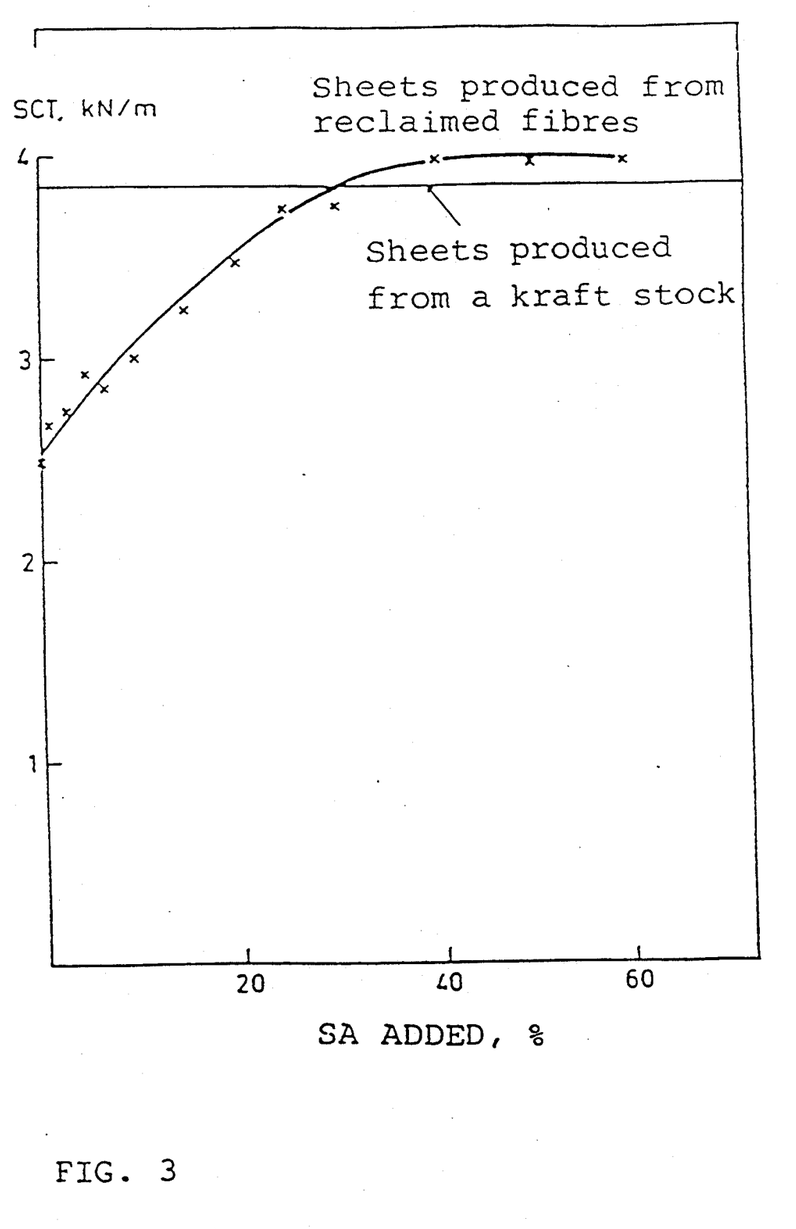
FIG. 3 is a graph showing the SCT compression strength as a function of added lignin in sheets produced from reclaimed fibers and sheets produced from Kraft stock.

When comparing the results with the characteristics of sheets made from virgin fibres, e.g. from a kraft stock, one may note that by adding high-molar mass lignin to reclaimed fibres more than 20% by weight, sheets can be produced on which the SCT values are equal to or better than the values of sheets manufactured from a kraft stock (FIG. 3).

EXAMPLE 5

The effect of the dry matter content of lignin on its adhesion to fibres

As is seen in Table 6, eleven kraft lignin solutions in the dry matter range 0.1 to 20% by weight were prepared. All solutions had pH 5, and the high-molar mass kraft lignin fraction was the same as in Example 2. Part of the kraft lignin was freeze-dried into a finely divided powder. Prior to drying, the pH of the lignin was adjusted to be 5.

The lignin quantity added was 30% by weight as dry matter calculated on the dry matter of stock produced from waste paper. The stock had consistency 8.5 g/l and pH about 7. The alum quantity added after the lignin addition was 2.0% by weight calculated as dry matter related to the stock dry matter, and it was added in the form of a 3% by weight aqueous solution. The retentions that were determined are stated in Table 6.

TABLE 5

The effect of high-molar mass lignin addition quantity on the characteristics of liner sheets produced from reclaimed fibres.

| SA added % | Dens. kg/m$^3$ | Air perm. s/100 ml | Comp. str. SCT kN/m | Comp. str. CCT kN/m | Tens. str. kN/m | Tens. index Nm/g | Cobb$_{60}$ g/m$^2$ | Water Drop |
|---|---|---|---|---|---|---|---|---|
| 0% | 500 | 94 | 2,47 | 1,58 | 5,01 | 34,8 | 159 | 95 |
| 0,5 | 498 | 86 | 2,69 | 1,84 | 5,10 | 35,2 | | 23 |
| 2,5 | 521 | 96 | 2,76 | 1,86 | 5,33 | 36,2 | | 77 |
| 5 | 527 | 146 | 2,92 | 1,92 | 5,72 | 38,6 | 27 | >300 |
| 7 | 520 | 95 | 2,82 | 1,88 | 5,74 | 37,5 | | >300 |
| 10 | 543 | 164 | 3,00 | 1,93 | 5,30 | 36,1 | 25 | " |
| 15 | 548 | 207 | 3,23 | 2,03 | 5,76 | 39,2 | 24 | " |
| 20 | 574 | 244 | 3,49 | 2,16 | 5,80 | 39,5 | 24 | " |
| 25 | 593 | 274 | 3,73 | 2,37 | 6,30 | 41,2 | | " |
| 30 | 592 | 537 | 3,73 | 2,20 | 6,01 | 40,9 | 20 | " |
| 40 | 595 | 373 | 3,98 | 2,43 | 5,91 | 39,4 | 22 | " |
| 50 | 602 | 396 | 3,96 | 2,36 | 5,92 | 40,8 | 32 | " |
| 60 | 614 | 477 | 3,97 | 2,26 | 5,72 | 40,9 | 19 | " |

Figure 2:
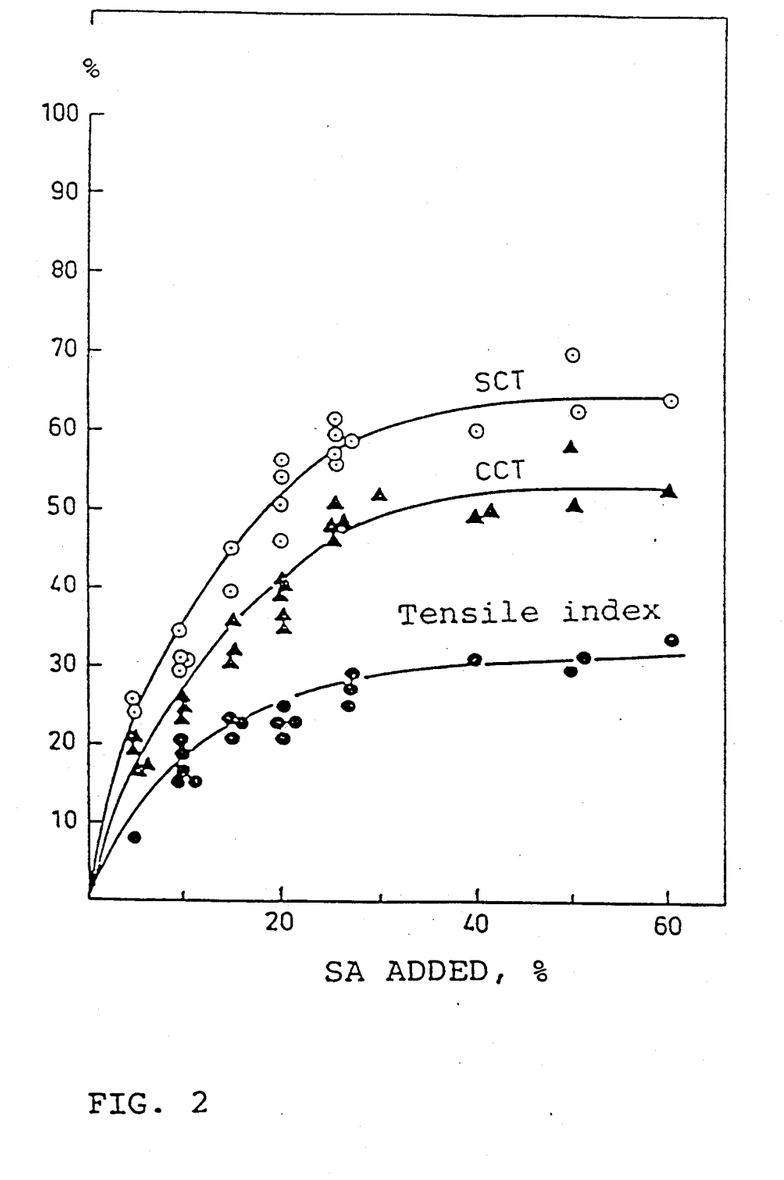
FIG. 2 is a graph showing the SCT compression strength, the CCT compression strength and tensile strength as a function of the added lignin.

The results are also shown in FIG. 2, in which the SCT compression strength, CCT compression strength and tensile strength values are calculated as percent improvement over the with sheets without lignin. As is seen in FIG. 2, the SCT values are bettered up to 60%. The Cobb$_{60}$ values, i.e., the amount of water absorbed by the cardboard in 60 seconds, were reduced from 159 to about 22 g/m~2~, or by 86% when the lignin additions were over 20%.

TABLE 6

The effect of the dry matter content of high-molar mass kraft lignin on its retention.

| Dry matter cont. of lignin % | Retention % | Consistency of slurry/ lignin/alum mixture, g/l |
|---|---|---|
| 0,10 | 98,4 | 3,1 |
| 0,15 | 97,1 | 4,1 |
| 0,20 | 96,0 | 4,9 |

TABLE 6-continued

The effect of the dry matter content of high-molar mass kraft lignin on its retention.

| Dry matter cont. of lignin % | Retention % | Consistency of slurry/ lignin/alum mixture. g/l |
|---|---|---|
| 0,40 | 97,8 | 6,8 |
| 0,60 | 98,5 | 7,7 |
| 0,80 | 98,5 | 8,4 |
| 1,0 | 98,8 | 8,8 |
| 3,0 | 98,8 | 10,2 |
| 5,0 | 98,9 | 10,5 |
| 10,0 | 99,0 | 10,7 |
| 20,0 | 99,9 | 10,9 |
| Powder (about 100%) | 93,7 | 11,0 |

As can be seen in the table, good retentions were achieved within the entire dry matter range 0.1 to 100%. Selection of appropriate dry matter content is therefore in the first place dependent on the production process used and on whether it is desired to reduce the consumption of water per ton of product, whereby for instance the drying costs will be lower.

EXAMPLE 6

The effect of the alum quantity on retention and on the characteristics of liner High-molae mass kraft lignin as in Example 2 was added as a 3% aqueous solution to stock produced from waste paper, at 30% by weight, calculated calculated as dry matter related to the stock dry matter. The pH of the lignin solution had been adjusted to about pH 5 with sulphuric acid before addition. The pH of the stock was adjusted to pH 5.3 prior to lignin addition. The alum addition varied in the range 0 to 10% by weight (on the stock dry matter).1 Liner sheets were produced in the laboratory, with base weight about 150 g/m² and thickness about 0.25 mm. The retentions and the characteristics of the liner are stated in Table 7.

TABLE 7

The effect of alum quantity added on retention and on the characteristics of liner sheet.

| Alum added % | Ret. % | Dens. kg/m³ | Air perm. s100 ml | Comp. str. SCT kN/m | Comp. str. CCT kN/m | Tens. str. kN/m | Tens. index Nm/g | Cobb$_{60}$ value gm² |
|---|---|---|---|---|---|---|---|---|
| Without lignin | | 500 | 94 | 2,47 | 1,58 | 5,01 | 34,8 | 159 |
| 0 | 97,9 | 621 | 226 | 3,08 | 1,78 | 4,76 | 33,8 | 60 |
| 0,5 | 98,2 | 560 | 283 | 3,08 | 1,80 | 4,88 | 38,7 | 26 |
| 1 | 99,0 | 583 | 281 | 4,06 | 1,93 | 5,00 | 37,6 | 19 |
| 1,5 | 99,0 | 587 | 286 | 3,09 | 1,92 | 4,81 | 37,6 | 18 |
| 2 | 99,4 | 563 | 286 | 3,14 | 1,77 | 4,77 | 37,0 | 22 |
| 2,5 | 99,3 | 601 | 279 | 3,15 | 1,74 | 4,28 | 34,0 | 47 |
| 3 | 99,3 | 597 | 313 | 3,40 | 2,11 | 5,08 | 36,9 | 24 |
| 5 | 98,0 | 597 | 328 | 3,49 | 1,89 | 5,15 | 36,3 | 22 |
| 7 | 98,2 | 619 | 286 | 3,52 | 1,87 | 5,48 | 38,3 | 21 |
| 10 | 98,8 | 605 | 300 | 3,51 | 2,02 | 5,10 | 36,2 | 24 |

As can be seen in Table 7, alum addition is not indispensable, but even with a small alum addition both the retentions and the characteristics of the sheets alrady improve.

EXAMPLE 7

The effect of precipitation chemicals on lignin retention

Salts of bivalent and trivalent metals, alum, $FeCl_3$, $Fe_2(SO_4)_3$, $FeSO_4$, polyaluminiumchloride (PAC), and cationic precipitation chemical, polyethylene imine (Polymin SK, BASF) were used for precipitation chemical for precipitating the high-molar mass lignin fraction onto reclaimed fibres. The quantity of lignin added was 30% by weight as dry matter, calculated on the slurry dry matter. The degree of purity of the lignin fraction was 89% by weight, and 79% by weight thereof has molar mass higher than 5000. pH of the lignin solution had been adjusted to pH 5 with sulphuric acid prior to precipitation, and its dry matter content was 3.0%. The precipitation chemicals were added as a 3% solution at 2% by weight of the stock dry matter, taking into account the crystal water in the chemical, if any. The effect of the chemicals on adhesion of the lignin to the fibres is indicated by the retention values, Table 8.

TABLE 8

The effect of precipitation chemicals on lignin retention

| Precipitation chemical | Lignin retention, % | pH of stock/lignin/ prec. chem. mixture |
|---|---|---|
| — | 92,3 | 6,7 |
| $H_2SO_4$ | 99,5 | 3,5 |
| $Al_2(SO_4)_3 \cdot 16H_2O$ | 99,9 | 4,8 |
| $FeCl_3 \cdot 6H_2O$ | 98,1 | 4,6 |
| $Fe_2(SO_4)_3$ | 99,6 | 5,0 |
| $FeSO_4 \cdot 7H_2O$ | 99,7 | 5,8 |
| PAC | 99,7 | 5,5 |
| Polymin SK | 99,7 | 6,3 |

As can be seen in Table 8, it is possible, using various precipitation chemicals, to increase the retention close to 100% without substantially increasing the acidity; this is often desirable considering the characteristics of the product, e.g. its sizability and printability. Achieving high retention is also important in view of the plant effluents.

EXAMPLE 8

Use of hogh-molar mass bleaching lignin in reinforcement of liner

From waste liquor from the alkali extraction step following after chlorination, originating from bleaching alkali-digested cellulose, a high-molar mass lignin fraction was isolated which had a molar mass of 37% by weight of M>5000, pH about 8 and dry matter content 17% by weight. Before precipitation, the lignin fraction was diluted to 3% by weight and its pH was adjusted to be below 3.

To a stock produced from reclaimed fibres, having pH 7, 30% by weight lignin fraction and 5% by weight polyimine were added, both calculated as dry matter related to the stock dry matter. Sheets with a grammage of 130 g/m² and thickness about 0.22 mm were produced in the laboratory. The characteristics determined from the sheets are stated in Table 9.

TABLE 9

The effect of high-molar mass lignin fraction isolated from bleaching waste liquor on the characteristics of sheets produced from reclaimed fibres.

|  | Density kg/m$^3$ | Porosity s/100 ml | Compr. str. SCT kN/m | Compr. str. CCT kN/m | Cobb$_{60}$ value g/m$^2$ | Water Drop s |
|---|---|---|---|---|---|---|
| Without lignin | 531 | 184 | 2,35 | 1,34 | 215 | 13 |
| Bleaching lign. | 605 | 480 | 3,04 | 1,66 | 146 | >300 |

As can be seen in Table 9, good characteristics were also achieved by using high-molecular lignin isolated from bleaching waste liquor.

EXAMPLE 9

Addition of lignin to a fibre web (Coating)

Using high-molar mass kraft lignin with 79% by weight of it exceeding M 5000, six aqueous solutions were prepared having 3% by weight dry matter content, and pH 3. The pH of five solutions was adjusted with sulphuric acid to, respectively, pH 3, 4, 5, 7 and 9. The first three were partly in suspension form. The lignin-water solutions/suspensions were added as a kind of coating to reclaimed fibre sheets, from which most of the water had been drained through the wire. The addition was 30% by weight, calculated as dry matter related to the dry matter of the fibres. For precipitation chemical, alum was used as a 3% solution, the addition being 2% by weight calculated as dry matter related to the dry matter of the fibres. The results are given in Table 10.

TABLE 10

Addition of lignin as a coating and its effect on the characteristics of reclaimed fibre liner.

| Lign. pH | Dens. kg/m$^3$ | Air perm. s/100 ml | Compr. str. SCT kN/m | Compr. str. CCT kN/m | Tens. str. kN/m | Tens. ind. kN/m | Cobb$_{60}$ value g/m$^2$ |
|---|---|---|---|---|---|---|---|
| 3 | 458 | 321 | 3,92 | 2,35 | 5,6 | 35,9 | 58 |
| 4 | 653 | 448 | 3,71 | 2,37 | 5,7 | 37,3 | 58 |
| 5 | 641 | 485 | 3,98 | 2,58 | 6,3 | 44,6 | 31 |
| 7 | 473 | 131 | 2,24 | 1,25 | 4,5 | 39,2 | 163 |
| 9 | 479 | 150 | 2,12 | 1,27 | 4,4 | 38,4 | 161 |
| 13 | 531 | 184 | 2,35 | 1,34 | 4,6 | 35,7 | 215 |
| Without lignin | 507 | 174 | 2,69 | 1,70 | 5,1 | 35,2 | 199 |

As can be seen in Table 10, by adding on the surface of sheets a lignin solution with pH adjusted to be below 7, the characteristics of liner produced from reclaimed fibres could be significantly improve in comparison with liner to which no lignin had been added.

EXAMPLE 10

The effect of lignin addition quantity on the characteristics of fiber produced from kraft stock To a kraft stock with a pH of 8.55 and a consistency of 18 g/l before precipitation, 0 to 50% by weight of high-molar mass kraft lignin as in Example 2 was added at 0 to 50% by weight dry matter, calculated on the stock dry matter, its pH being adjusted to pH 5 before precipitation. For precipitation chemical, alum as a 3% by weight solution was used, added to the fibres at 2% by weight, calculated as dry matter related to the stock dry matter. The grammage of the liner sheets that were produced was about 150 g/m$^2$ and thickness about 0.26 mm. The other characteristics, determined at 50% relative humidity, unless otherwise stated, were as follows:

TABLE 11

The effect of high-molar mass kraft lignin on the characteristics of liner produced from kraft stock.

| Lign. added | Dens. kg/m$^3$ | Air perm. s/100 ml | Comp. str. SCT kN/m | Comp. str. CCT kN/m | Tens. str. kN/m | Tens. ind. Nm/g | Cobb$_{60}$ value g/m$^2$ | 85%-humid. SCT kN/m |
|---|---|---|---|---|---|---|---|---|
| 0 | 550 | 5,4 | 3,10 | 1,83 | 6,93 | 48,5 | 34 | 1,64 |
| 5 | 579 | 6,5 | 3,44 | 1,95 | 7,54 | 51,6 | 32 | 1,86 |
| 10 | 574 | 6,0 | 3,52 | 1,99 | 7,91 | 53,4 | 27 | 1,90 |
| 20 | 565 | 5,3 | 3,45 | 1,90 | 7,74 | 52,7 | 25 | 1,90 |
| 30 | 578 | 6,2 | 3,47 | 2,00 | 7,79 | 52,6 | 27 | 1,89 |
| 40 | 596 | 7,8 | 3,51 | 2,11 | 8,08 | 54,2 | 26 | 1,94 |
| 50 | 593 | 9,7 | 3,65 | 2,19 | 8,19 | 54,6 | 26 | 1,96 |

As can be seen in Table 11, also virgin fibres can be reinforced with high-molar mass lignin. The SCT values have here increased by 20%, both at 50% and 85% relative humidity of air. The quantity of lignin added, calculated at 5% by weight dry matter related to the stock dry matter, implies that when for instance the added quantity is 50% by weight, the composition of the stock/lignin mixture is 33% by weight lignin dry matter and 67% by weight stock dry matter.

EXAMPLE 11

Production of fibreboards

To a fibre suspension which had consistency 10 g/l, high-molar mass kraft lignin was added, as a 5% solution, at 1 and 2.5% by weight. The lignin was precipitated onto the fibres with alum, added as a 3% solution at 1% by weight, calculated as dry matter related to the dry matter of the fibres.

The production conditions of fibre boards were as follows: hot pressing temperature 205° C., pressure 0.5 Nm/mm$^2$, and pressing time 6 to 7 minutes. The sheets were post-hardened at 160° C. for 4 hours.

The characteristics of the boards are given in Table 12, where also the characteristics of fibre boards made with phenolic resin are stated.

TABLE 12

| | The characteristics of fibre boards | | | | |
|---|---|---|---|---|---|
| Bonding agent | Quant. added % | Flexur. str. N/mm$^2$ | Tens. str. N/mm$^2$ | Water uptake 24 h, % | Swelling 24 h, % |
| Phenolic resin | 1 | 501 | 2,22 | 27,2 | 16.8 |
| High-molar mass kraft lignin | 1 | 612 | 2,56 | 23,6 | 15,3 |
| D:o | 2,5 | 546 | 265 | 26,6 | 16,7 |

As can be seen in Table 12, the results achieved with high-molar mass kraft lignin are better than those with phenolic resin. Thus, the strength characteristics of fibreboards could be improved in an economically advantageous way.

We claim:

1. A method for manufacturing products from lignocellulosic material and for improving their strength and water resistance characteristics, comprising the steps of adding to an aqueous slurry of lignocellulosic fiber material, high molecular weight lignin derivatives of which at least 35% by weight of said lignin derivatives have a molecular weight over 5000 to provide a lignocellulosic/lignin mixture, said lignin derivatives being unpolymerized with added resin, adjusting the acidity of the lignocellulosic/lignin mixture to a value in the range of pH 2 to pH 7 to effect precipitation of said lignin derivatives on said cellulosic fibers.

2. The method of claim 1, characterized in that at least 40% by weight of the lignin derivatives have molecular weight over 5000.

3. The method of claim 1, characterized in that the lignin derivatives are added as an aqueous solution and have a purity such that at least 70% by weight of the total dry matter is precipitated from a 1-5% solution with 1M hydrochloric acid at pH 3.

4. The method of claim 3, characterized in that the aqueous solution of the lignin derivatives is acidized so that its pH is below 7 before its addition to the lignocellulosic material.

5. The method of claim 1, characterized in that the lignocellulosic material is neutralized or acidized before adding lignin.

6. The method of claim 1, characterized in that the quantity of said lignin derivatives to be added to the lignocellulosic material is 1% to 60% by weight, calculated as lignin dry matter related to the dry matter of the lignocellulosic material.

7. The method of claim 1, characterized in that the dry matter content of the lignin derivatives at addition to the lignocellulosic material is in the range 0.1% to 100% by weight.

8. The method of claim 1, characterized in that the lignin derivatives are added to the lignocellulosic material so that the retention of the lignin derivatives is over 90%.

9. The method of claim 1, characterized in that the lignin derivatives originate from alkaline cellulose manufacturing processes.

10. The method of claim 1, characterized in that the lignin derivatives originate from the Kraft pulping process.

11. The method of claim 1, characterized in that the lignin derivatives originate from a cellulose bleaching process.

12. The method of claim 1, and including the step of adding to the lignocellulosic material, before or after lignin addition, bivalent or trivalent metal salts, at 0.5% to 10% by weight, calculated as dry matter related to the dry matter of the lignin/lignocellulose material.

13. The method of claim 1, and including the step of adding to the lignocellulosic material, before or after the lignin addition, cationic, organic precipitation chemicals, at 0.5% to 10% by weight, calculated as dry matter related to the dry matter of the lignin/lignocellulose material.

14. The method of claim 12, wherein said salts are selected from the group consisting of alum, ferric sulfate, ferrous sulfate, and ferric chloride.

15. The method of claim 13, wherein said precipitation chemical comprises polyethylene imine.

* * * * *